United States Patent
Savagaonkar et al.

(10) Patent No.: US 12,353,608 B2
(45) Date of Patent: *Jul. 8, 2025

(54) SECURE COLLABORATION BETWEEN PROCESSORS AND PROCESSING ACCELERATORS IN ENCLAVES

(71) Applicant: Google LLC, Mountain View, CA (US)

(72) Inventors: Uday Savagaonkar, Redmond, WA (US); Eric Northup, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,055

(22) Filed: Dec. 21, 2023

(65) Prior Publication Data
US 2024/0126930 A1    Apr. 18, 2024

Related U.S. Application Data

(63) Continuation of application No. 17/046,535, filed as application No. PCT/US2018/042695 on Jul. 18, 2018, now Pat. No. 11,921,905.
(Continued)

(51) Int. Cl.
*G06F 21/72*    (2013.01)
*G06F 13/42*    (2006.01)
(Continued)

(52) U.S. Cl.
CPC .......... *G06F 21/72* (2013.01); *G06F 13/4221* (2013.01); *G06F 21/602* (2013.01); *G06F 21/79* (2013.01); *G06F 2213/0026* (2013.01)

(58) Field of Classification Search
CPC ........ G06F 21/72; G06F 21/602; G06F 21/79; G06F 21/78; G06F 13/4221; G06F 2213/0026; H04L 63/0428; H04L 63/06
See application file for complete search history.

(56) References Cited

U.S. PATENT DOCUMENTS

| 5,970,250 A | 10/1999 | England et al. |
| 6,779,112 B1 | 8/2004 | Guthery |

(Continued)

FOREIGN PATENT DOCUMENTS

| CN | 1685297 A | 10/2005 |
| CN | 103826161 A | 5/2014 |

(Continued)

OTHER PUBLICATIONS

M. M. Ozdal, "Emerging Accelerator Platforms for Data Centers," in IEEE Design & Test, vol. 35, No. 1, pp. 47-54, Feb. 2018 (Year: 2018).*

(Continued)

*Primary Examiner* — Sangseok Park
(74) *Attorney, Agent, or Firm* — Lerner David LLP

(57) ABSTRACT

Aspects of the disclosure relate to providing a secure collaboration between one or more PCIe accelerators and an enclave. An example system may include a PCIe accelerator apparatus. The PCIs accelerator apparatus may include the one or more PCIe accelerators and a microcontroller configured to provide a cryptographic identity to the PCIe accelerator apparatus. The PCIe accelerator apparatus may be configured to use the cryptographic identity to establish communication between the PCIe accelerator apparatus the enclave.

20 Claims, 5 Drawing Sheets

Related U.S. Application Data

(60) Provisional application No. 62/672,680, filed on May 17, 2018, provisional application No. 62/664,438, filed on Apr. 30, 2018.

(51) Int. Cl.
*G06F 21/60* (2013.01)
*G06F 21/79* (2013.01)

(56) References Cited

U.S. PATENT DOCUMENTS

| | | |
|---|---|---|
| 6,938,159 B1 | 8/2005 | O'Connor et al. |
| 7,170,999 B1 | 1/2007 | Kessler et al. |
| 7,203,844 B1 | 4/2007 | Oxford |
| 7,624,433 B1 | 11/2009 | Clark et al. |
| 7,661,131 B1 | 2/2010 | Shaw et al. |
| 7,694,328 B2 | 4/2010 | Joshi et al. |
| 7,788,711 B1 | 8/2010 | Sun et al. |
| 7,904,940 B1 | 3/2011 | Hernacki et al. |
| 8,145,909 B1 | 3/2012 | Agrawal et al. |
| 8,155,036 B1 | 4/2012 | Brenner et al. |
| 8,220,035 B1 | 7/2012 | Pravetz et al. |
| 8,245,285 B1 | 8/2012 | Ravishankar et al. |
| 8,353,016 B1 | 1/2013 | Pravetz et al. |
| 8,442,527 B1 | 5/2013 | Machiraju et al. |
| 8,631,486 B1 | 1/2014 | Friedman et al. |
| 8,769,127 B2 | 7/2014 | Selimis et al. |
| 9,246,690 B1 | 1/2016 | Roth et al. |
| 9,251,047 B1 | 2/2016 | McKelvie et al. |
| 9,374,370 B1 | 6/2016 | Bent, II et al. |
| 9,444,627 B2 | 9/2016 | Varadarajan et al. |
| 9,444,948 B1 | 9/2016 | Ren et al. |
| 9,460,077 B1 | 10/2016 | Casey |
| 9,531,727 B1 | 12/2016 | Himberger et al. |
| 9,584,517 B1 | 2/2017 | Roth et al. |
| 9,615,253 B1 | 4/2017 | Osborn |
| 9,710,748 B2 | 7/2017 | Ross et al. |
| 9,735,962 B1 | 8/2017 | Yang et al. |
| 9,754,116 B1 | 9/2017 | Roth et al. |
| 9,779,352 B1 | 10/2017 | Hyde et al. |
| 9,935,937 B1 | 4/2018 | Potlapally et al. |
| 9,940,456 B2 | 4/2018 | Nesher et al. |
| 10,007,464 B1 | 6/2018 | Blinzer |
| 10,021,088 B2 | 7/2018 | Innes et al. |
| 10,104,049 B2 | 10/2018 | Hamilton |
| 10,205,803 B1 | 2/2019 | Sharifi Mehr |
| 10,333,903 B1 * | 6/2019 | Campagna .......... H04L 63/0428 |
| 10,375,177 B1 | 8/2019 | Bretan |
| 10,382,202 B1 | 8/2019 | Ohsie et al. |
| 10,530,777 B2 | 1/2020 | Costa |
| 10,685,131 B1 | 6/2020 | Lunsford et al. |
| 10,931,652 B2 | 2/2021 | Costa |
| 11,159,498 B1 | 10/2021 | Casu et al. |
| 11,210,412 B1 | 12/2021 | Ghetti et al. |
| 2002/0099952 A1 | 7/2002 | Lambert et al. |
| 2003/0005118 A1 | 1/2003 | Williams |
| 2003/0009583 A1 | 1/2003 | Chan et al. |
| 2003/0074584 A1 | 4/2003 | Ellis |
| 2003/0133574 A1 | 7/2003 | Caronni et al. |
| 2003/0196110 A1 | 10/2003 | Lampson et al. |
| 2003/0200431 A1 | 10/2003 | Stirbu |
| 2003/0202523 A1 | 10/2003 | Buswell et al. |
| 2003/0236975 A1 | 12/2003 | Birk et al. |
| 2004/0030764 A1 | 2/2004 | Birk et al. |
| 2004/0093522 A1 | 5/2004 | Bruestle et al. |
| 2005/0050316 A1 | 3/2005 | Peles |
| 2005/0081039 A1 | 4/2005 | Lee et al. |
| 2005/0105884 A1 | 5/2005 | Satoh et al. |
| 2005/0140788 A1 | 6/2005 | Fox et al. |
| 2005/0144437 A1 | 6/2005 | Ransom et al. |
| 2005/0149726 A1 | 7/2005 | Joshi et al. |
| 2005/0149732 A1 | 7/2005 | Freeman et al. |
| 2005/0166191 A1 | 7/2005 | Kandanchatha et al. |
| 2005/0198622 A1 | 9/2005 | Ahluwalia et al. |
| 2005/0204345 A1 | 9/2005 | Rivera et al. |
| 2006/0021004 A1 | 1/2006 | Moran et al. |
| 2006/0021010 A1 | 1/2006 | Atkins et al. |
| 2006/0095969 A1 | 5/2006 | Portolani et al. |
| 2006/0130131 A1 | 6/2006 | Pai et al. |
| 2006/0174037 A1 | 8/2006 | Bernardi et al. |
| 2006/0225055 A1 | 10/2006 | Tieu |
| 2006/0274695 A1 | 12/2006 | Krishnamurthi et al. |
| 2007/0014399 A1 | 1/2007 | Scheidt et al. |
| 2007/0061264 A1 | 3/2007 | Yeung et al. |
| 2007/0074046 A1 | 3/2007 | Czajkowski et al. |
| 2007/0233602 A1 | 10/2007 | Zweig et al. |
| 2008/0005573 A1 | 1/2008 | Morris et al. |
| 2008/0005798 A1 | 1/2008 | Ross |
| 2008/0091948 A1 | 4/2008 | Hofmann et al. |
| 2008/0152132 A1 | 6/2008 | Sung et al. |
| 2008/0181404 A1 | 7/2008 | Matsuki et al. |
| 2008/0244257 A1 | 10/2008 | Vaid et al. |
| 2008/0250249 A1 | 10/2008 | Ma et al. |
| 2008/0307020 A1 | 12/2008 | Ko et al. |
| 2008/0320263 A1 | 12/2008 | Nemiroff et al. |
| 2009/0077655 A1 | 3/2009 | Sermersheim et al. |
| 2009/0097657 A1 | 4/2009 | Scheidt et al. |
| 2009/0228951 A1 | 9/2009 | Ramesh et al. |
| 2009/0235347 A1 | 9/2009 | Syed et al. |
| 2010/0042828 A1 | 2/2010 | Masui et al. |
| 2010/0150352 A1 | 6/2010 | Mansour et al. |
| 2010/0191959 A1 | 7/2010 | Czajkowski |
| 2010/0228990 A1 | 9/2010 | Billings et al. |
| 2010/0235623 A1 | 9/2010 | Simpson et al. |
| 2010/0313246 A1 | 12/2010 | Irvine et al. |
| 2011/0023082 A1 | 1/2011 | Narasinghanallur et al. |
| 2011/0075652 A1 | 3/2011 | Ogura |
| 2011/0113244 A1 | 5/2011 | Chou et al. |
| 2011/0145589 A1 | 6/2011 | Camenisch et al. |
| 2011/0161676 A1 | 6/2011 | Datta et al. |
| 2011/0225559 A1 | 9/2011 | Nishide |
| 2012/0063593 A1 | 3/2012 | Camenisch et al. |
| 2012/0063597 A1 | 3/2012 | Tropp et al. |
| 2012/0121085 A1 | 5/2012 | Leung et al. |
| 2012/0151568 A1 | 6/2012 | Pieczul et al. |
| 2012/0159184 A1 | 6/2012 | Johnson et al. |
| 2012/0226902 A1 | 9/2012 | Kim |
| 2012/0246463 A1 | 9/2012 | Shea et al. |
| 2012/0272217 A1 | 10/2012 | Bates |
| 2012/0275601 A1 | 11/2012 | Matsuo |
| 2012/0278634 A1 | 11/2012 | Luukkala et al. |
| 2012/0297206 A1 | 11/2012 | Nord et al. |
| 2012/0324218 A1 | 12/2012 | Duren et al. |
| 2013/0111549 A1 | 5/2013 | Sowatskey et al. |
| 2013/0125197 A1 | 5/2013 | Pravetz et al. |
| 2013/0159726 A1 | 6/2013 | McKeen et al. |
| 2013/0166907 A1 | 6/2013 | Brown et al. |
| 2013/0247164 A1 | 9/2013 | Hoggan |
| 2013/0312074 A1 | 11/2013 | Sarawat et al. |
| 2013/0312117 A1 | 11/2013 | Sapp et al. |
| 2013/0333054 A1 | 12/2013 | Duke |
| 2014/0047532 A1 | 2/2014 | Sowatskey |
| 2014/0068254 A1 | 3/2014 | Scharf et al. |
| 2014/0086406 A1 | 3/2014 | Polzin et al. |
| 2014/0086410 A1 | 3/2014 | Takizawa |
| 2014/0089617 A1 | 3/2014 | Polzin et al. |
| 2014/0089712 A1 | 3/2014 | Machnicki et al. |
| 2014/0157410 A1 | 6/2014 | Dewan et al. |
| 2014/0181516 A1 | 6/2014 | Yoshioka |
| 2014/0189246 A1 | 7/2014 | Xing et al. |
| 2014/0189326 A1 | 7/2014 | Leslie et al. |
| 2014/0267332 A1 | 9/2014 | Chhabra et al. |
| 2014/0281544 A1 | 9/2014 | Paczkowski et al. |
| 2014/0281560 A1 | 9/2014 | Ignatchenko et al. |
| 2014/0297962 A1 | 10/2014 | Rozas et al. |
| 2014/0337983 A1 | 11/2014 | Kang et al. |
| 2015/0007291 A1 | 1/2015 | Miller |
| 2015/0033012 A1 | 1/2015 | Scarlata et al. |
| 2015/0089173 A1 | 3/2015 | Chhabra et al. |
| 2015/0113279 A1 | 4/2015 | Andersen et al. |
| 2015/0127946 A1 | 5/2015 | Miller et al. |
| 2015/0131919 A1 | 5/2015 | Dewangan et al. |
| 2015/0178226 A1 | 6/2015 | Scarlata et al. |
| 2015/0188887 A1 | 7/2015 | Thomas et al. |

(56) References Cited

U.S. PATENT DOCUMENTS

| | | |
|---|---|---|
| 2015/0200949 A1 | 7/2015 | Willhite et al. |
| 2015/0249645 A1 | 9/2015 | Sobel et al. |
| 2015/0281279 A1 | 10/2015 | Smith et al. |
| 2015/0347768 A1 | 12/2015 | Martin et al. |
| 2016/0036786 A1 | 2/2016 | Gandhi |
| 2016/0080379 A1 | 3/2016 | Saboori et al. |
| 2016/0110540 A1 | 4/2016 | Narendra Trivedi et al. |
| 2016/0134599 A1 | 5/2016 | Ross et al. |
| 2016/0147979 A1 | 5/2016 | Kato |
| 2016/0171248 A1 | 6/2016 | Nesher et al. |
| 2016/0173287 A1 | 6/2016 | Bowen |
| 2016/0179702 A1 | 6/2016 | Chhabra et al. |
| 2016/0188350 A1 | 6/2016 | Shah et al. |
| 2016/0188873 A1 | 6/2016 | Smith et al. |
| 2016/0188889 A1 | 6/2016 | Narendra Trivedi et al. |
| 2016/0219044 A1 | 7/2016 | Karunakaran et al. |
| 2016/0219060 A1 | 7/2016 | Karunakaran et al. |
| 2016/0226913 A1 | 8/2016 | Sood et al. |
| 2016/0283411 A1 | 9/2016 | Sheller et al. |
| 2016/0285858 A1 | 9/2016 | Li et al. |
| 2016/0316025 A1 | 10/2016 | Lloyd et al. |
| 2016/0330301 A1 | 11/2016 | Raindel et al. |
| 2016/0350534 A1 | 12/2016 | Poornachandran et al. |
| 2016/0359965 A1 | 12/2016 | Murphy et al. |
| 2016/0366123 A1 | 12/2016 | Smith et al. |
| 2016/0371540 A1 | 12/2016 | Pabbichetty |
| 2016/0380985 A1 | 12/2016 | Chhabra et al. |
| 2017/0093564 A1 | 3/2017 | Bernat et al. |
| 2017/0093572 A1 | 3/2017 | Hunt et al. |
| 2017/0126660 A1 | 5/2017 | Brannon |
| 2017/0126661 A1 | 5/2017 | Brannon |
| 2017/0185766 A1 | 6/2017 | Narendra Trivedi et al. |
| 2017/0201380 A1 | 7/2017 | Schaap et al. |
| 2017/0214712 A1 | 7/2017 | Maxwell et al. |
| 2017/0223080 A1 | 8/2017 | Velayudhan et al. |
| 2017/0256304 A1 | 9/2017 | Poornachandran et al. |
| 2017/0264643 A1 | 9/2017 | Bhuiyan et al. |
| 2017/0286320 A1 | 10/2017 | Chhabra et al. |
| 2017/0286721 A1 | 10/2017 | Xing |
| 2017/0331815 A1 | 11/2017 | Pawar et al. |
| 2017/0338954 A1 | 11/2017 | Yang et al. |
| 2017/0346848 A1 | 11/2017 | Smith et al. |
| 2017/0353319 A1 | 12/2017 | Scarlata et al. |
| 2017/0364452 A1 | 12/2017 | Okhravi et al. |
| 2017/0364908 A1 | 12/2017 | Smith et al. |
| 2017/0366359 A1 | 12/2017 | Scarlata et al. |
| 2018/0059917 A1 | 3/2018 | Takehara |
| 2018/0069708 A1 | 3/2018 | Thakore |
| 2018/0089468 A1 | 3/2018 | Rozas et al. |
| 2018/0097809 A1 | 4/2018 | Chakrabarti et al. |
| 2018/0113811 A1 | 4/2018 | Xing |
| 2018/0114012 A1 | 4/2018 | Sood et al. |
| 2018/0114013 A1* | 4/2018 | Sood ................ G06F 21/606 |
| 2018/0145968 A1 | 5/2018 | Rykowski et al. |
| 2018/0183578 A1 | 6/2018 | Chakrabarti et al. |
| 2018/0183580 A1 | 6/2018 | Scarlata et al. |
| 2018/0183586 A1 | 6/2018 | Bhargav-Spantzel et al. |
| 2018/0184290 A1 | 6/2018 | Luo et al. |
| 2018/0191695 A1 | 7/2018 | Lindemann |
| 2018/0192287 A1 | 7/2018 | Ozzie |
| 2018/0210742 A1 | 7/2018 | Costa |
| 2018/0211018 A1 | 7/2018 | Yang |
| 2018/0211034 A1 | 7/2018 | Costa |
| 2018/0211035 A1 | 7/2018 | Costa |
| 2018/0211054 A1 | 7/2018 | Costa |
| 2018/0212966 A1 | 7/2018 | Costa |
| 2018/0212971 A1 | 7/2018 | Costa |
| 2018/0212996 A1 | 7/2018 | Nedeltchev et al. |
| 2018/0213401 A1 | 7/2018 | Yang |
| 2018/0232517 A1 | 8/2018 | Roth et al. |
| 2018/0234255 A1 | 8/2018 | Fu |
| 2018/0270045 A1 | 9/2018 | Almuhammadi et al. |
| 2018/0278588 A1* | 9/2018 | Cela ................ H04L 63/0227 |
| 2018/0285560 A1 | 10/2018 | Negi et al. |
| 2018/0295115 A1 | 10/2018 | Kumar et al. |
| 2018/0300556 A1 | 10/2018 | Varerkar et al. |
| 2018/0337920 A1 | 11/2018 | Stites et al. |
| 2018/0349649 A1 | 12/2018 | Martel et al. |
| 2018/0351941 A1 | 12/2018 | Chhabra |
| 2018/0375655 A1 | 12/2018 | Thom et al. |
| 2019/0026234 A1 | 1/2019 | Harnik et al. |
| 2019/0028460 A1 | 1/2019 | Bhargava et al. |
| 2019/0034617 A1 | 1/2019 | Scarlata et al. |
| 2019/0044724 A1 | 2/2019 | Sood et al. |
| 2019/0044729 A1 | 2/2019 | Chhabra et al. |
| 2019/0050551 A1 | 2/2019 | Goldman-Kirst et al. |
| 2019/0058577 A1 | 2/2019 | Bowman et al. |
| 2019/0058696 A1 | 2/2019 | Bowman et al. |
| 2019/0103074 A1 | 4/2019 | Chhabra et al. |
| 2019/0109877 A1 | 4/2019 | Samuel et al. |
| 2019/0121964 A1 | 4/2019 | LeMay et al. |
| 2019/0147188 A1 | 5/2019 | Benaloh et al. |
| 2019/0149531 A1 | 5/2019 | Kakumani et al. |
| 2019/0156050 A1 | 5/2019 | Tenginakai et al. |
| 2019/0158474 A1 | 5/2019 | Kashyap et al. |
| 2019/0163898 A1 | 5/2019 | Clebsch et al. |
| 2019/0182367 A1 | 6/2019 | Kim et al. |
| 2019/0197231 A1 | 6/2019 | Meier |
| 2019/0245882 A1 | 8/2019 | Kesavan et al. |
| 2019/0253256 A1 | 8/2019 | Saab et al. |
| 2019/0258811 A1 | 8/2019 | Ferraiolo et al. |
| 2019/0310862 A1 | 10/2019 | Mortensen et al. |
| 2020/0233953 A1 | 7/2020 | Palsson et al. |
| 2020/0387470 A1 | 12/2020 | Cui et al. |
| 2022/0083647 A1 | 3/2022 | LeMay et al. |
| 2022/0083648 A1 | 3/2022 | LeMay et al. |

FOREIGN PATENT DOCUMENTS

| | | | |
|---|---|---|---|
| CN | 106997438 A | 8/2017 | |
| CN | 107111715 A | 8/2017 | |
| CN | 107787495 A | 3/2018 | |
| CN | 107851162 A | 3/2018 | |
| EP | 1757067 A1 | 2/2007 | |
| EP | 3477532 A1 * | 5/2019 | ......... G06F 12/1458 |
| WO | 0143344 A1 | 6/2001 | |
| WO | 2012082410 A2 | 6/2012 | |
| WO | 2014062618 A1 | 4/2014 | |
| WO | 2014158431 A1 | 10/2014 | |
| WO | 2014196966 A1 | 12/2014 | |
| WO | 2015066028 A1 | 5/2015 | |
| WO | 2015094261 A1 | 6/2015 | |
| WO | 2016209526 A1 | 12/2016 | |
| WO | 2018027059 A1 | 2/2018 | |
| WO | 2018063571 A1 | 4/2018 | |

OTHER PUBLICATIONS

The Next Platform, retrieved from https://www.nextplatform.com/2017/04/05/first-depth-look-googles-tpu-architecture/ (2017).

Google Cloud Platform, retrieved from https://cloudplatform.googleblog.com/2017/08/Titan-in-depth-security-in-plaintext.html (2017).

Jouppi, N., et al., "In-Datacenter Performance Analysis of a Tensor Processing Unit", 44th International Symposium on Computer Architecture (ISCA), (2017) 17 pgs.

McKeen, Frank, et al., "Intel® Software Guard Extensions (Intel® SGX) Support for Dynamic Memory Management Inside an Enclave", Intel Corporation (2016) 9 pgs.

"Proceedings of USENIX ATC '17 2017 USENIX Annual Technical Conference", USENIX, USENIX, the Advanced Computing Systems Association, Jul. 12, 2017 (Jul. 12, 2017), pp. 1-811, XP061023212, [retrieved on Jul. 12, 2017].

International Search Report and Written Opinion for PCT Application No. PCT/US2018/042695, dated Oct. 4, 2018. 16 pages.

Invitation to Pay Additional Fees, Communication Relating to the Results of the Partial International Search, and Provisional Opinion Accompanying the Partial Search Result for PCT Application No. PCT/US2018/042625, dated Oct. 8, 2018. 14 pages.

Invitation to Pay Additional Fees, Communication Relating to the Results of the Partial International Search, and Provisional Opinion

(56) References Cited

OTHER PUBLICATIONS

Accompanying the Partial Search Result for PCT Application No. PCT/US2018/042684, dated Oct. 10, 2018. 14 pages.
International Search Report and Written Opinion for PCT Application No. PCT/US2018/042625, dated Nov. 30, 2018. 19 pages.
International Search Report and Written Opinion for PCT Application No. PCT/US2018/042684, dated Dec. 5, 2018. 19 pages.
International Preliminary Report on Patentability for International Application No. PCT/US2018/042695 dated Nov. 12, 2020. 9 pages.
International Preliminary Report on Patentability for International Application No. PCT/US2018/042625 dated Nov. 12, 2020. 12 pages.
International Preliminary Report on Patentability for International Application No. PCT/US2018/042684 dated Nov. 12, 2020. 12 pages.
First Examination Report for Indian Patent Application No. 202047046012 dated Sep. 17, 2021. 7 pages.
First Examination Report for Indian Patent Application No. 202047046281 dated Dec. 7, 2021. 6 pages.
First Examination Report for Indian Patent Application No. 202047046246 dated Dec. 6, 2021. 5 pages.
Office Action for European Patent Application No. 18750026.9 dated May 9, 2022. 6 pages.
Office Action for European Patent Application No. 18753285.8 dated Jul. 5, 2022. 8 pages.
Extended European Search Report for European Patent Application No. 22207041.9 dated Feb. 10, 2023. 8 pages.
Office Action for Chinese Patent Application No. 201880092471.6 dated Aug. 31, 2023. 10 pages.
Office Action for Chinese Patent Application No. 201880092577.6 dated Sep. 11, 2023. 8 pages.

* cited by examiner

SECURE COLLABORATION BETWEEN PROCESSORS AND PROCESSING ACCELERATORS IN ENCLAVES

CROSS-REFERENCE TO RELATED APPLICATIONS

The present application is a continuation of U.S. patent application Ser. No. 17/046,535, filed Oct. 9, 2020, which is a national phase entry under 35 U.S.C. § 371 of International Application No. PCT/US2018/042695, filed Jul. 18, 2018, which claims the benefit of the filing date of U.S. Provisional Application No. 62/664,438, filed Apr. 30, 2018 and U.S. Provisional Application No. 62/672,680, filed May 17, 2018, the disclosures of which are hereby incorporated herein by reference.

BACKGROUND

Enclave technologies may enable software programmers to develop secure applications that are contained inside secure execution environments called enclaves. An application that runs inside an enclave typically has safeguards like memory and code integrity, and memory encryption. These safeguards protect the enclave from code that executes outside of the enclave, like the operating system, hypervisor, or other system software. In cloud-based computing, this can provide safeguards against intrusions by all sorts of actors, including personnel of the cloud operator. For instance, cloud-based machine learning workloads can include very sensitive information, such as personal data or location information. These workloads can also consume computational resources from central processing units (CPUs) as well as from various processing accelerators. Protecting the integrity of such workloads without compromising efficiency is an important goal for such systems. For instance, moving the processing parts of the workload from the accelerators back to the CPU and running them inside a CPU enclave may be useful from security perspective, but may dramatically reduce efficiency of the computations.

SUMMARY

Aspects of the disclosure provide a system for providing a secure collaboration between one or more PCIe accelerators and an enclave. The system includes an PCIe accelerator apparatus including the one or more PCIe accelerators and a microcontroller configured to provide a cryptographic identity to the PCIe accelerator apparatus. The PCIe accelerator apparatus is configured to use the cryptographic identity to establish communication between the PCIe accelerator apparatus the enclave.

In one example, the system also includes a circuit board on each of the one or more PCIe accelerators and the microcontroller are arranged. In another example, each of the one or more PCIe accelerators is a tensor processing unit. In another example, each of the one or more PCIe accelerators is a graphical processing unit. In another example, the PCIe accelerator apparatus further comprises an application processor configured to communicate with the enclave. In this example, the application processor is incorporated into the microcontroller. In addition or alternatively, the application processor further includes a dedicated function for communicating with an operating system of a computing device on which the enclave resides. In this example, the dedicated function is configured to enable a communication path between the application processor and the enclave via the computing device. In addition or alternatively, the system also includes the computing device. In addition or alternatively, the system also includes memory on which the enclave is stored. In another example, the PCIe accelerator apparatus further includes a cryptographic engine configured to encrypt information entering the PCIe accelerator apparatus. In another example, the PCIe accelerator apparatus further includes a cryptographic engine configured to decrypt information leaving the PCIe accelerator apparatus. In this example, the cryptographic engine is a line-rate cryptographic engine. In addition or alternatively, the cryptographic engine is arranged in a PCIe path of all of the one or more PCIe accelerators. In addition or alternatively, the PCIe accelerator apparatus further comprises an application processor configured to manage keys used by the cryptographic engine.

Another aspect of the disclosure provides a method for providing a secure collaboration between one or more PCIe accelerators and an enclave. The method includes retrieving, by one or more PCIe accelerator, encrypted one or both of code or data out of memory of a host computing device; decrypting, by the one or more PCIe accelerator, the encrypted one or both of code or data using a cryptographic engine; processing, by the one or more PCIe accelerators, the unencrypted one or both of code or data using and generate results; encrypting, by the one or more PCIe accelerators, the results; and sending, by the one or more PCIe accelerators, the encrypted results back to the memory of the host computing device for storage.

In one example, the method also includes negotiating, by the one or more PCIe accelerators, a cryptographic session with an enclave. In another example, the cryptographic session is negotiated through host OS-mediated communication. In another example, the encrypted one or both of code or data are retrieved using direct memory access. In another example, the encrypted results are sent using direct memory access.

DETAILED DESCRIPTION

Overview

Figure 1:
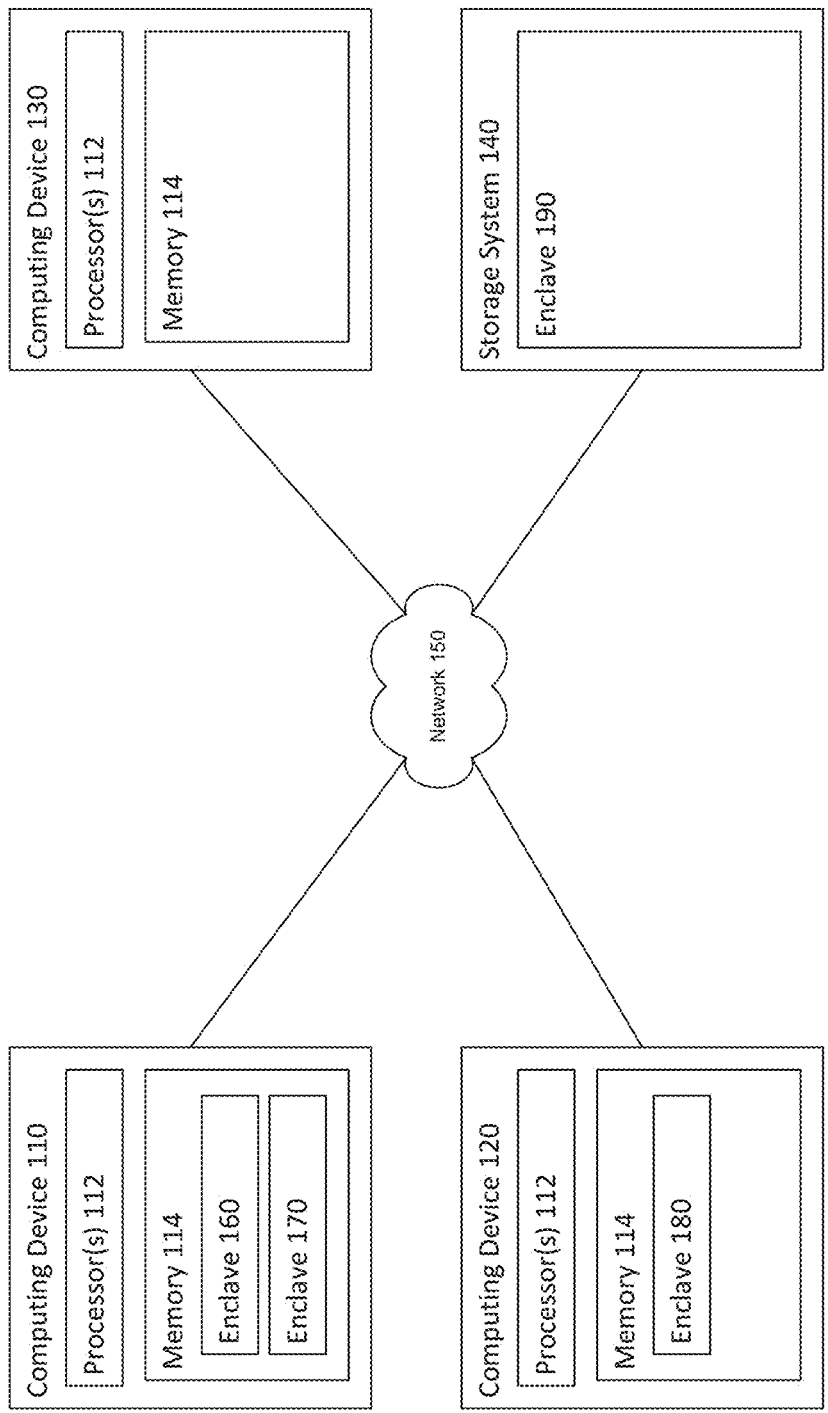
FIG. 1 is a functional diagram of an example system in accordance with aspects of the disclosure.

Aspects of the disclosure relate to enabling secure collaboration between CPUs and processing accelerators using an enclave-based system. For instance, a computing device may include a plurality of processors and memory. The memory may include one or more enclaves that can be used to store data and instructions while at the same time limit the use of such data and instructions by other applications. For instance the data may include sensitive information such as passwords, credit card data, social security numbers, or any other information that a user would want to keep confidential. The plurality of processors may include CPUs as well as hardware based processors or accelerators such as Peripheral Component Interconnect Express (PCIe) accelerators including special-purpose integrated circuits that can be used to perform neural network computations.

In order to secure the processing of a PCIe accelerator, a PCIe accelerator apparatus may include hardware that may be arranged on the circuit board with one or more PCIe accelerators in order to give the PCIe accelerator apparatus a cryptographic hardware identity and the ability to perform authenticated encryption and/or decryption. For instance, an application that wants to use a PCIe accelerator securely, may runs its application logic as well as the entire or one or more parts of the PCIe accelerator software stack inside an enclave or a set of enclaves.

When a computing device's operating system allocates one or more PCIe accelerators for use by an application, a PCIe accelerator apparatus and the enclave may negotiate a cryptographic session through OS-mediated communication. The enclave may then use this cryptographic session to encrypt the PCIe accelerator code and data, and may hand those out to the OS, which, in turn may hand them to the one or more PCIe accelerators. The one or more PCIe accelerator retrieve the code and/or data out of the computing device's memory, decrypt those using a cryptographic engine, process the data using the code, and generate results. The one or more PCIe accelerator also encrypt the results with the same cryptographic session before sending them back to memory of the processing device.

For instance, in order to provide a secure collaboration between processors and processing accelerators in enclaves, a PCIe accelerator apparatus may include a plurality of PCIe accelerators arranged on a circuit board, an application processor, a microcontroller and a cryptographic engine.

The microcontroller may endow the PCIe accelerator apparatus with a cryptographic hardware identity and also ensures the integrity of the code running on the AP. The application processor may also utilize services provided by the microcontroller to assert the PCIe accelerator apparatus's hardware identity during session establishment between the enclave and the application processor. The cryptographic engine may be arranged in the PCIe direct memory access (DMA) path of the PCIe accelerator and may provide encryption and decryption operations for the PCIe accelerators. The application processor may be configured to manage the keys used by the cryptographic engine and may also be responsible for ensuring semantic integrity of any buffers being decrypted by the cryptographic crypto engine.

The features described here provide for secure processing of information on a processing accelerator such as a TPU, a GPU, or other types of PCIe accelerators. This is achieved by providing additional hardware on a circuit board of one or more PCIe accelerator to provide that apparatus with a cryptographic hardware identity and the ability to perform authenticated encryption and decryption at PCIe line rate with minimal additional latency. In addition, the features described herein may enable PCIe accelerator to directly consume data that is encrypted at rest, without it having to be decrypted and re-encrypted with the session key.

Example Systems

FIG. 1 includes an example enclave system 100 in which the features described herein may be implemented. It should not be considered as limiting the scope of the disclosure or usefulness of the features described herein. In this example, enclave system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (Soc) or other chips with memory, that may include one or more enclaves.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. In addition or alternatively, the processors can be dedicated components such as an application specific integrated circuit ("ASIC") or other hardware-based processor, such as PCIe accelerators including Tensor Processing Units (TPU), graphical processing units (GPU), etc. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processors, memory, and other elements of computing device 110 as being within the same block, the processors, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by the computing devices 110, 120, 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the instructions of each of computing devices 110, 120, 130 may include one or more applications. These applications may define enclaves 160, 170, 180, 190 within memory, either locally at memory 114 or remotely at the storage system 140. Each enclave can be used to store data and instructions while at the same time limit the use of such data and instructions by other applications. For instance the data may include sensitive information such as passwords, credit card data, social security numbers, or any other information that a user would want to keep confidential. The instructions may be used to limit the access to such data. Although computing device 110 includes only two enclaves, computing device 120 includes only 1 enclave, computing device 130 includes no enclaves, and storage system 140 includes only 1 enclave, any number of enclaves may be defined with the memory of the computing devices 110, 120 or storage system 140.

Figure 2:
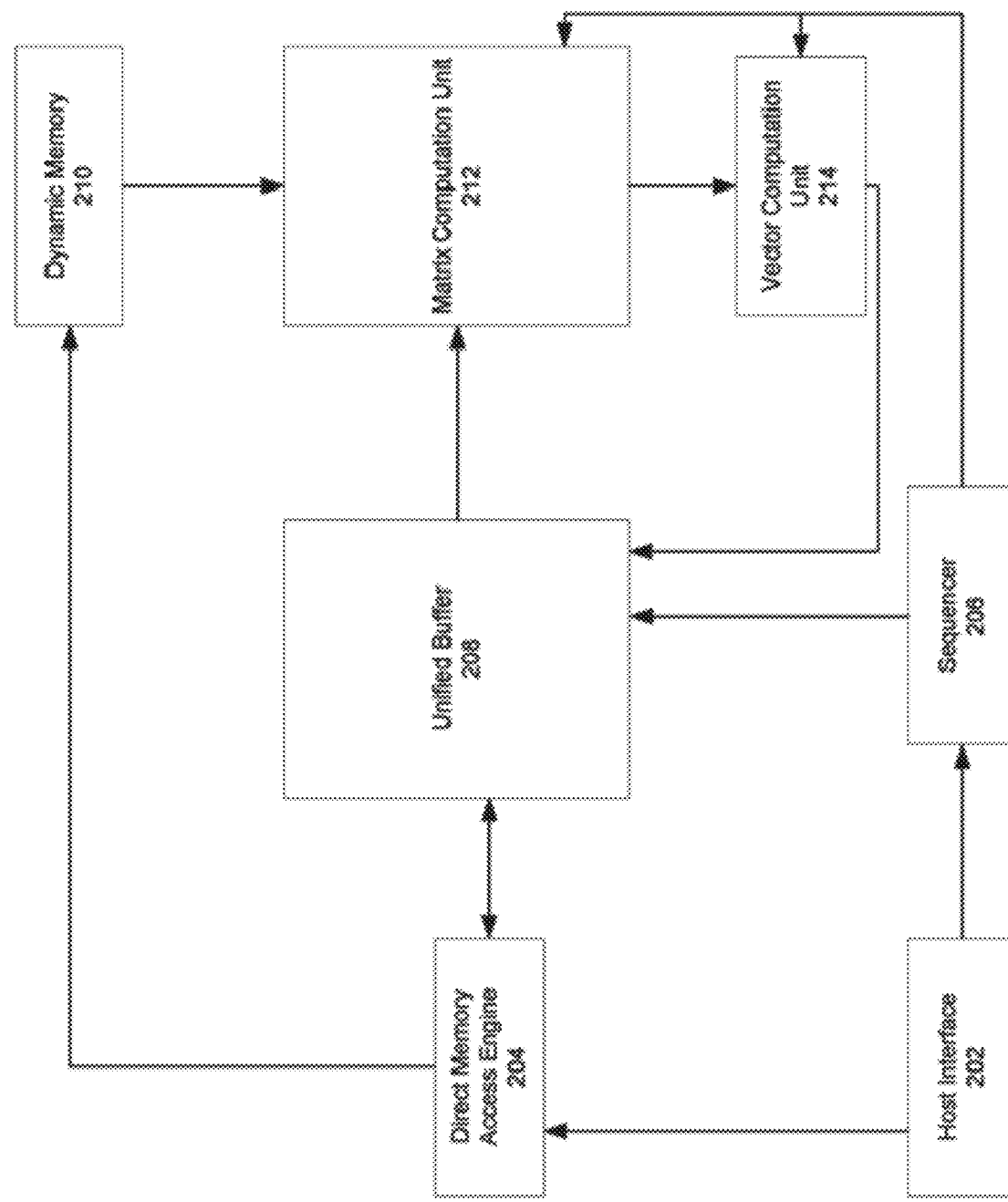
FIG. 2 is a functional diagram of an example Tensor Processing Unit (TPU) in accordance with aspects of the disclosure.

As noted above, processors 112 may include CPUs as well as hardware based processors or accelerators such as TPUs, GPUs, and other PCIe accelerators. A TPU is a special-purpose integrated circuit that can be used to perform neural network computations. As shown in the example functional diagram of a TPU 200 in FIG. 2, a TPU may include host interface 202. The host interface 202 can include one or more PCIe connections that enable the TPU 200 to receive instructions that include parameters for a neural network computation. The host interface 202 can send the instructions to a sequencer 206, which converts the instructions into low level control signals that control the circuit to perform the neural network computations. The sequencer 206 can send the control signals to a unified buffer 208, a matrix computation unit 212, and a vector computation unit 214. In some implementations, the sequencer 206 also sends control signals to a DMA engine 204 and dynamic memory 210 which can be a memory unit. The host interface 202 can send sets of weight inputs and an initial set of activation inputs to the DMA engine 204. The DMA 204 can store the sets of activation inputs at the unified buffer 208.

The unified buffer 208 is a memory buffer. It can be used to store the set of activation inputs from the DMA engine 204 and outputs of the vector computation unit 214. The DMA engine 204 can also read the outputs of the vector computation unit 214 from the unified buffer 208. The dynamic memory 210 and the unified buffer 208 can send the sets of weight inputs and the sets of activation inputs, respectively, to the matrix computation unit 212. The matrix computation unit 212 can process the weight inputs and the activation inputs and provide a vector of outputs to the vector computation unit 214. In some implementations, the matrix computation unit sends the vector of outputs to the unified buffer 208, which sends the vector of outputs to the vector computation unit 214. The vector computation unit can process the vector of inputs and store a vector of processed outputs to the unified buffer 208. The vector of processed outputs can be used as activation inputs to the matrix computation unit 212, e.g., for use in a subsequent layer in the neural network.

Figure 3:
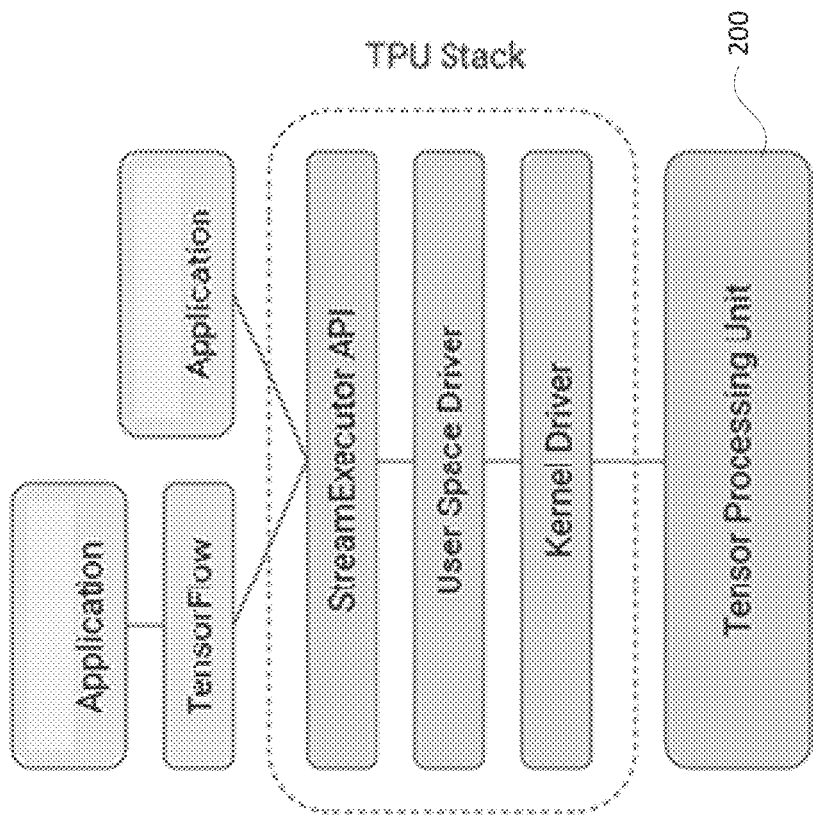
FIG. 3 are example representation of a software stack in accordance with aspects of the disclosure.

FIG. 3 provides an example representation of a TPU software stack. A TPU workload may begin as an application written to an application programming interface (API) for interacting with the TPU such as the TensorFlow software library. API libraries and a compiler running on the host CPU, such as one of the processors 112, may generate the executable instructions for one or more TPUs, for instance, based on a sequence of API calls to the TensorFlow library. The application, utilizing the services exposed by a kernel driver program of the computing device 110, may communicate memory-locations of the generated code buffers as well as data buffers to the TPU. Using the DMA engine 204, the TPU DMAs the generated executable instructions, along with the associated data from the host memory, such as memory 114, into local memory of the TPU, such as the dynamic memory 210 and the unified buffer 208 discussed above. The TPU then executes the DMA-ed instructions, processing the fetched data from the host memory to generate the output. Finally, the TPU DMAs the results back into the host memory, where the application picks the results up.

In order to secure the processing of a TPU, hardware may be arranged on the TPU circuit board in order to give the TPU or that entire apparatus a cryptographic hardware identity and the ability to perform authenticated encryption and/or decryption at PCIe line rate with minimal additional latency. For instance, an application that wants to use TPUs securely, may run its application logic as well as the entire or one or more parts of the TPU software stack inside an enclave or a set of enclaves. Where multiple enclaves are involved, a "primary" enclave may be responsible for dealing with the one or more TPUs and the primary and other enclave or enclaves may communicate with one another over secure connections for instance, using a remote procedure call handshake protocol which enables secure communications between different entities.

Figure 4:
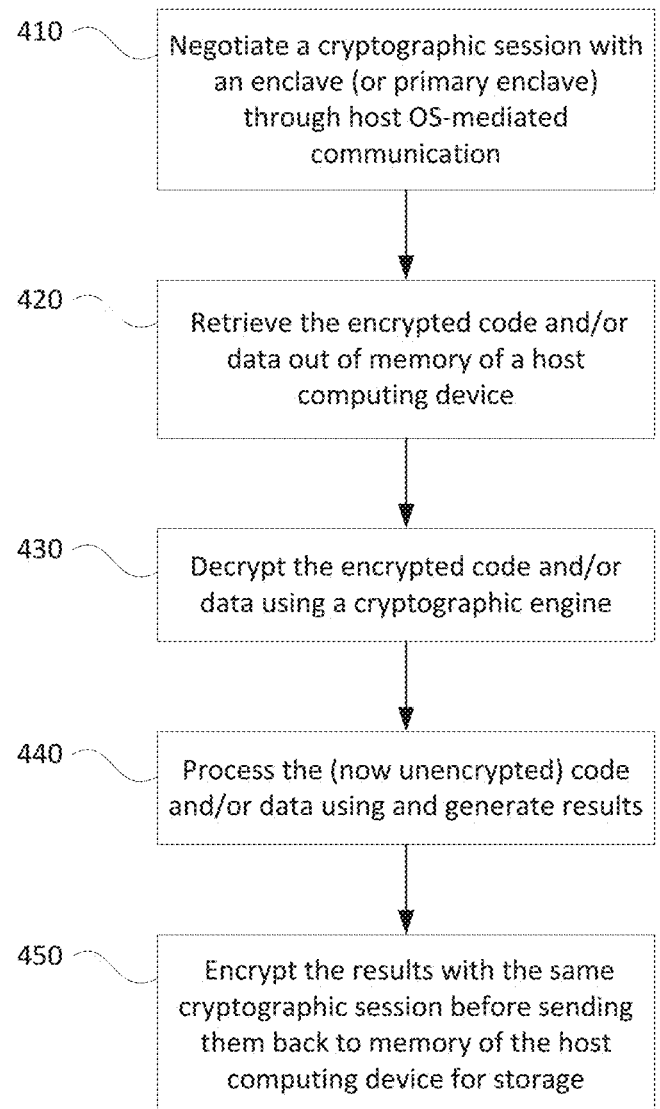
FIG. 4 is an example flow diagram in accordance with aspects of the disclosure.

In some instances, the host operating system (OS) may allocates one or more PCIe accelerators for use by the application. FIG. 4 is an example flow diagram of how the PCIe accelerators may operate in order to process data and/or code according to the requirements, needs or requests of the application. For instance, at block 410, one or more PCIe accelerators of a PCIe accelerator apparatus negotiate a cryptographic session with an enclave (or primary enclave) through host OS-mediated communication. The enclave then use this cryptographic session to encrypt the PCIe accelerator code and/or data and sends this encrypted code and/or data out to the host OS, which, in turn may store the encrypted code and/or date in memory to be accessed by the one or more PCIe accelerators. As such, at block 420, the one or more PCIe accelerators retrieve the encrypted code and/or data out of memory of the host computing device. At block 430, the one or more PCIe accelerators decrypt the encrypted code and/or data using a cryptographic engine, such as a cryptographic engine 560 discussed further below. The one or more PCIe accelerators process the (now unencrypted) code and/or data using and generate results at bock 440. The one or more PCIe accelerator also encrypt the results with the same cryptographic session before sending them back to memory of the host computing device for storage at block 450. The encrypted results can then be accessed as needed by the application.

In the example of a TPU-board, the TPU-board may receive encrypted code and/or data, decrypt the received encrypted code and/or data, process the decrypted code and/or data to generate results, encrypt the results, and send the encrypted results back to the host operating system. In order to do so, the TPU-board may negotiate a cryptographic session with the enclave (or primary enclave) through Host OS-mediated communication. The enclave may then use this cryptographic session to encrypt the TPU code and/or data, and sends the encrypted code and/or data t to the Host OS, which, in turn hands them to the one or more TPUs of the TPU-board. As such, the one or more TPUs DMA the code and/or data out of the host memory. The accessed code and/or data is then decrypted using a cryptographic engine of the one or more TPUs. Thereafter the unencrypted code and/or data is processed by the one or more TPUs in order to generate results. The one or more TPUs also encrypt the results with the same cryptographic session before DMA-ing the encrypted results back to host operating system for storage at the host memory. The encrypted results can then be accessed as needed by the application.

This system may enable TPUs to directly consume data that is encrypted at rest, without it having to be decrypted and re-encrypted with the session key. This is needed, for example, to enable users to encrypt their data-sets on premises before transmitting them to third parties. Requiring these data-sets to be decrypted and re-encrypted with the session key may incur unreasonable overheads.

Figure 5:
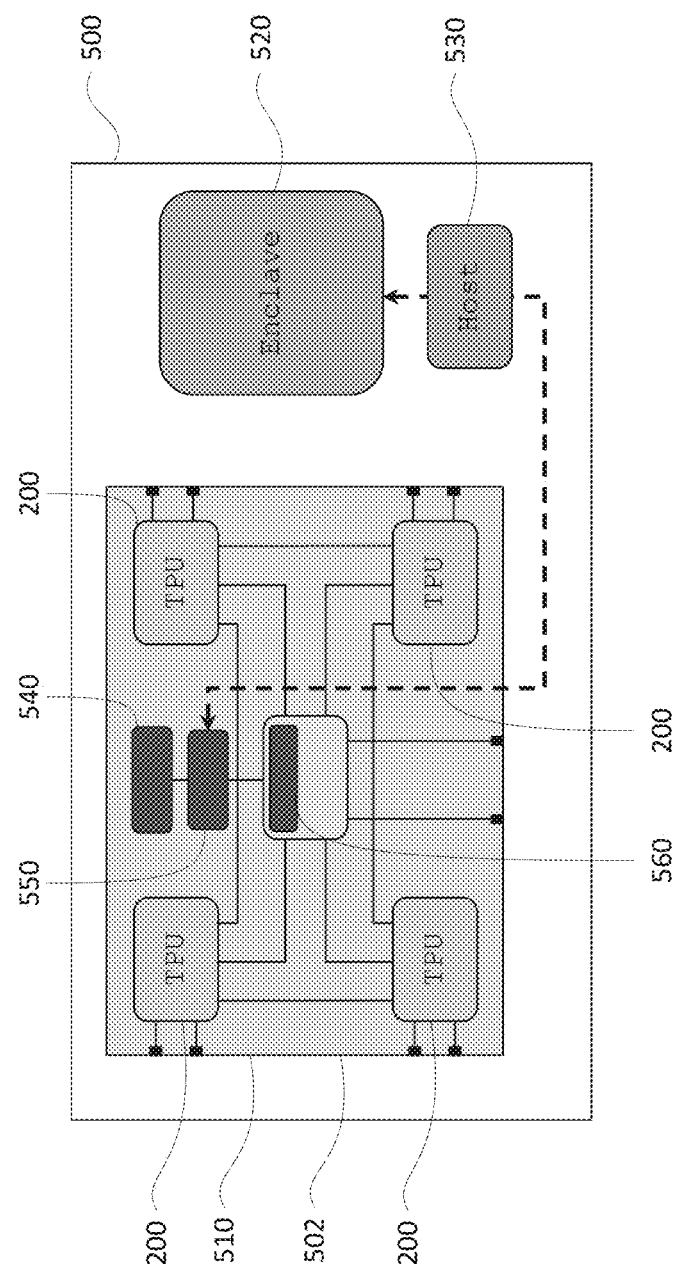
FIG. 5 is a diagram of an example system in accordance with aspects of the disclosure.

FIG. 5 provides a diagram of an example system 500 for providing a secure collaboration between processors and processing accelerators in enclaves. System 500 includes a PCIe accelerator apparatus 502, an enclave 520, and a host 530 including a host OS. In this example, the enclave 520 may represent one or more enclaves such as enclaves 160, 170, 180, or 190, and the host may represent any of computing devices 110, 120, and 130.

The PCIe accelerator apparatus 502 includes a plurality of TPU 200 arranged on a TPU circuit board or TPU board 510, an Application Processor (AP) 540, a microcontroller 550 and the cryptographic engine 560 each connected to the TPU board 510. In some examples, the entire logic on the PCIe board could be integrated into a single ASIC, which is then soldered onto the host computing devices main board. Alternatively, the entire logic could be integrated as an IP block into the SoC containing the CPU.

The AP 540 may be a general-purpose application processor. During operation, the AP 540 may expose a dedicated BDF (Bus/Device/Function) to the host OS. The host OS can use memory mapped input output (MMIO) registers of this BDF to enable a communication path between the enclave 520 and the AP. This communication may be used for enabling session-establishment between the enclave 520 and the AP 540 as well as for session life-time management by the host OS. This interface may also be utilized by the OS to update the firmware of the microcontroller 550.

The microcontroller 550 may be a low-power microcontroller, such as a Titan chip by Google LLC, or a combination of a commercially available low-power microcontroller and a Trusted Platform Module (TPM), which provides hardware security by providing a cryptographic identity to hardware to which the microcontroller is attached. In this regard, the microcontroller 550 may provide the TPU board 510 and/or TPUs 200 with a cryptographic identity.

The microcontroller may include various components such as a secure application processor, a cryptographic co-processor, a hardware random number generator, a key hierarchy, embedded static RAM (SRAM), embedded flash, and a read-only memory block. The microcontroller 550 may include unique keying material securely stored in a registry database. The contents of this database may cryptographically protected using keys maintained in an offline quorum-based Certification Authority (CA). The microcontroller 550 can generate Certificate Signing Requests (CSRs) directed at the microcontroller 550's CA, which can verify the authenticity of the CSRs using the information in the registry database before issuing identity certificates.

The microcontroller-based identity system not only verifies the provenance of the chips creating the CSRs, but also verifies the firmware running on the chips, as the code identity of the firmware is hashed into the key hierarchy of the microcontroller. This property enables remediation and allows us to fix bugs in Titan firmware, and issue certificates that can only be wielded by patched Titan chips. The microcontroller-based identity system may also enable back-end systems to securely provision secrets and keys to the host 530, host OS, or jobs running on the host. The microcontroller may also be able to chain and sign critical audit logs and make those logs tamper-evident. To offer tamper-evident logging capabilities, the microcontroller 550 may cryptographically associates the log messages with successive values of a secure monotonic counter maintained by the microcontroller, and signs these associations with the controller's private key. This binding of log messages with secure monotonic counter values ensures that audit logs cannot be altered or deleted without detection, even by insiders with root access to the host 530.

As noted above, the microcontroller 550 may endow the PCIe accelerator apparatus with a cryptographic hardware identity and may also ensure the integrity of the code running on the AP 540. The AP may utilize services provided by the microcontroller to assert the PCIe accelerator apparatus's hardware identity. These services may include, for instance, the microcontroller certifying keys, such as Diffie Hellman keys, generated by the EP as belonging to the AP as well as generating assertions of the microcontroller's identity for authentication and authorization processes.

The cryptographic engine 560 may be arranged in the DMA or PCIe path of the TPUs 200 and may provide encryption and decryption operations for the TPUs 200. The cryptographic engine 560 may enable the TPUs 200 to decrypt information such as code and/or data buffers read from the host memory and encrypt information such as result buffers written back to the host. The cryptographic engine may include a line-rate cryptographic engine. As an example, line-rate may refer to the maximum supported data-transfer rate of the interface; in this case, PCIe. For instance, PCIe gen 3 supports 12.5 giga-bits-per-second of data transfer in each direction, per lane. In a 16-lane interface, this would amount to 25 giga-bytes-per-second data transfer rate in each direction. So the cryptographic engine must be enabled enough to support 25 giga-bytes-per-second of decrypt and 25 giga-bytes-per-second of encrypt.

The AP 540 may be configured to manage the keys used by the cryptographic engine 560. The AP 540 may also be responsible for ensuring semantic integrity of any buffers being decrypted by the cryptographic engine 560. This will allow the TPUs to utilize decrypted buffers in a manner the source enclave, for instance, enclave 520, intended them to utilize the buffer. As such, for example, the host OS would not be able to confuse the TPU into using a data buffer as a code buffer. The enclave 520 will create a small amount of semantic metadata, cryptographically bind it to each of the DMA buffers including the code and/or data being transferred from the host to the TPUs and communicate the information to the AP 540. The AP will then utilize this information to direct the DMA crypto engine appropriately. In some instances, AP 540 and the microcontroller 550 may be the same physical chip.

In operation, the aforementioned security details may be "hidden" from the programmer of the application. From the programmer's point of view, it should be possible to enable a few compile-time flags to get the protections without having to rewrite the programmer's code.

Encrypting the code and/or data buffers on CPU, only to be decrypted on the TPU may add performance bottlenecks. Enabling TPUs to directly DMA into an enclave's memory might ease such bottlenecks. This may require additional features. For instance, enclave implementations may need to add enhancements to selectively allow accelerator-initiated DMA from trusted accelerators. The enclave code must have control over which accelerators it wants to trust. In addition, accelerators may need to be endowed with industry-standard cryptographic identity. This identity must be verified by an input-output memory management unit (IOMMUthat allows an enclave to specify which of the verified identities are trusted. In addition, accelerators, at least to some extent, may need to understand the enclave access-control model as well as CPU virtual addresses while also utilizing ATS (Address Translation Service) and translation caching to prevent OS tampering.

At present, TPUs are single-context devices. That is, a collection of TPUs can only work on one application at a time. In the event that TPUs are expanded into multi-context devices, the features described herein can be applied to multi-context TPUs as well. In addition, although the examples herein relate specifically to TPUs, the features described herein may be applied to other types of PCIe accelerators, such as GPUs, as well.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system for providing a secure collaboration between one or more hardware accelerators and an enclave defined within memory of a host computing device, the system comprising an accelerator apparatus configured to:
negotiate a cryptographic session between the one or more hardware accelerators and the enclave using a cryptographic hardware identity provided by a microcontroller; and
during the cryptographic session:
retrieve encrypted information from the enclave;
decrypt the encrypted information using a cryptographic engine that is separate from the one or more hardware accelerators;
retrieve unencrypted information;
process the unencrypted information to generate results;
encrypt the results using the cryptographic engine; and
send the encrypted results back to the enclave.

2. The system of claim 1, wherein the one or more hardware accelerators comprise at least one of a tensor processing unit or a graphics processing unit.

3. The system of claim 1, wherein the accelerator apparatus is further configured to manage keys used by the cryptographic engine for the encryption and decryption operations using an application processor.

4. The system of claim 1, wherein the accelerator apparatus is further configured to manage the cryptographic hardware identity using an application processor.

5. The system of claim 1, wherein the cryptographic engine is configured to decrypt information leaving the enclave during the cryptographic session.

6. The system of claim 1, wherein the cryptographic engine is configured to encrypt information entering the enclave during the cryptographic session.

7. The system of claim 1, wherein the cryptographic engine is a line-rate cryptographic engine.

8. The system of claim 1, wherein the cryptographic engine is arranged between the one or more hardware accelerators and the enclave.

9. The system of claim 1, wherein the accelerator apparatus is further configured to generate certificate signing requests (CSRs) to secure the cryptographic hardware identity using the microcontroller.

10. A method for providing a secure collaboration between one or more hardware accelerators and an enclave defined within memory of a host computing device, the method comprising:
negotiating, by one or more processors, a cryptographic session between the one or more hardware accelerators and the enclave using a cryptographic hardware identity provided by a microcontroller; and during the cryptographic session:
retrieving, by the one or more processors, encrypted information from the enclave;
decrypting, by the one or more processors, the encrypted information using a cryptographic engine that is separate from the one or more hardware accelerators;
retrieving, by the one or more processors, unencrypted information;
processing, by the one or more processors, the unencrypted information to generate results;
encrypting, by the one or more processors, the results using the cryptographic engine; and
sending, by the one or more processors, the encrypted results back to the enclave.

11. The method of claim 10, wherein the one or more hardware accelerators comprise at least one of a tensor processing unit or a graphics processing unit.

12. The method of claim 10, further comprising managing, by the one or more processors, keys used by the cryptographic engine for the encryption and decryption operations using an application processor.

13. The method of claim 10, further comprising managing, by the one or more processors, the cryptographic hardware identity using an application processor.

14. The method of claim 10, wherein the cryptographic engine is a line-rate cryptographic engine.

15. The method of claim 10, wherein the cryptographic engine is arranged between the one or more hardware accelerators and the enclave.

16. The method of claim 10, further comprising generating, by the one or more processors, certificate signing request (CSRs) to secure the cryptographic hardware identity using the microcontroller.

17. A non-transitory computer-readable medium storing instructions executable by one or more processors for providing a secure collaboration between one or more hardware accelerators and an enclave defined within memory of a host computing device, the instructions comprising:
negotiating a cryptographic session between the one or more hardware accelerators and the enclave using a cryptographic hardware identity provided by a microcontroller; and
during the cryptographic session:
retrieving encrypted information from the enclave;
decrypting the encrypted information using a cryptographic engine that is separate from the one or more hardware accelerators;
retrieving unencrypted information;
processing the unencrypted information to generate results;
encrypting the results using the cryptographic engine; and
sending the encrypted results back to the enclave.

18. The non-transitory computer-readable medium of claim 17, wherein the one or more hardware accelerators comprise at least one of a tensor processing unit or a graphics processing unit.

19. The non-transitory computer-readable medium of claim 17, wherein the instructions further comprise:
managing keys used by the cryptographic engine for the encryption and decryption operations using an application processor; and
managing the cryptographic hardware identity using the application processor.

20. The non-transitory computer-readable medium of claim 17, wherein the instructions further comprise generating certificate signing request (CSRs) to secure the cryptographic hardware identity using the microcontroller.

* * * * *